United States Patent [19]

Grove et al.

[11] 4,299,483
[45] Nov. 10, 1981

[54] PATH ALIGNMENT APPARATUS

[76] Inventors: Thomas C. Grove, 1104 Elm, Ft. Collins, Colo. 80521; William S. Bennet, II, 8236 Cedar Crest Way, Sacramento, Calif. 95826

[21] Appl. No.: 93,691

[22] Filed: Nov. 13, 1979

[51] Int. Cl.³ .......................... G01B 11/26; G05B 1/00
[52] U.S. Cl. .................................. 356/152; 250/202; 340/27 NA; 356/5; 356/141; 358/103; 358/109; 364/456
[58] Field of Search ..................... 364/456; 340/25, 26, 340/27 NA, 32; 250/202; 356/4, 5, 141, 152; 358/103, 109

[56] References Cited

U.S. PATENT DOCUMENTS

| | | | |
|---|---|---|---|
| 3,043,908 | 7/1962 | Madsen | 358/109 |
| 3,254,156 | 5/1966 | Kegelman | 358/109 |
| 3,705,955 | 12/1972 | Assouline et al. | 358/103 |
| 4,019,060 | 4/1977 | Woodman | 356/152 |
| 4,049,961 | 9/1977 | Marcy | 250/202 |
| 4,118,733 | 10/1978 | Sarson et al. | 358/109 |

OTHER PUBLICATIONS

NASA Tech. Brief 68-10311, Aug. 1968.

*Primary Examiner*—S. C. Buczinski
*Attorney, Agent, or Firm*—Hugh H. Drake

[57] ABSTRACT

An airplane or other vehicle is to be used for repeated traverses over an assigned area successively in respective different ones of a plurality of parallel paths displaced laterally one from another. Path alignment apparatus carried by the vehicle cooperates with delivery means that dispenses a material along each of the paths in a swath of predetermined width. The material includes an agent that presents characteristic radiation at a predetermined frequency. A sensing means is oriented to view the path of approach of the vehicle for detecting the radiation and developing a discriminated signal which distinguishes between presence and absence of the radiation. Developed by range-finding means is a distance signal that represents location of the vehicle relative to the location of the path being approached. Also included are indication means for response to the discriminated signal and the distance signal in order to develop an information signal that represents the degree of departure as between a longitudinal edge margin of a previously dispensed swath and a new swath being approached by the vehicle. As a result, it is possible for the operator of the vehicle to cause the dispensing of the material in successive swaths with a minimum of either overlap or underlap as between successively displaced swaths.

20 Claims, 7 Drawing Figures

Fig_1

Fig_2

Fig_2a

Fig_3

Fig_5

PATH ALIGNMENT APPARATUS

The present invention pertains to path alignment apparatus. More particularly, it relates to apparatus carried by a vehicle capable of laying down a succession of swaths of a material without an undesired amount of either overlap or underlap as between laterally adjacent swaths.

While the concepts underlying the specific implementation of the present invention as embodied in this application are believed to be applicable to several different fields of use and may involve implementation by use of a variety of different vehicles, these concepts arose as a result of specific consideration of the field of agriculture and the use of aircraft to the benefit thereof. Accordingly, that which follows is particularly addressed to that field and to the use of that type of vehicle.

In this area, a major report has been produced, under date of February 1978, by Econ Incorporated under Contract No. NASW-27 1 for the Office of Aeronautics and Space Administration. Certain parts of that study were summarized in an article "Ag-Air: A Growing Industry" by Fred Clyne and which appeared beginning at page 18 of the July 1978 issue of *WAA*, the official publication of the National Agricultural Aviation Association.

Some general information of interest, covered in detail by the study, is that a cumulative annual area of some one-hundred-eighty-million acres of land was treated by air and that that produced gross revenues exceeding one billion dollars. About seventy percent of the crops treated were composed of cotton, rice, wheat, miscellaneous vegetables, corn, soybeans and sorghum. Another thirty percent covered a variety of applications ranging from timber to roadside ditches. In the various treatment endeavors, aircraft were used to dispense such materials as seed, fertilizer, herbicide, insecticide, defoliant, fungicide and miscellaneous others. Just for the seventy percent of crops more fully analyzed, the study revealed that almost two-million hours of flying time were involved to treat the aforementioned one-hundred-eighty-million acres out of a total agricultural surface area of about two-hundred-thirty-eight-million acres. The total value in crops concerned was of the order of forty billion dollars.

One aspect of agricultural spraying focused upon by the aforementioned study was the need for improved uniformity of application of the dispensed materials. In an example applied to the production of a certain kind of rice in Texas, involving the treatment of a little over five-hundred-thousand acres, it was computed that improved uniformity of application of the dispensed material could amount to an annual savings of almost 1.9 million dollars. Of course, the advantages of uniformity of application have long been recognized. To the extent that successive spray swaths depart from one another, the crop suffers by reason of non-application of the material to that portion. Knowing this, the person controlling the application is inclined to overlap successive swaths. In turn, that not only wastes the applied material but may also cause crop damage by reason of excessive application to the overlapped portion. In addition, of course, such overlap also results in a waste of the expensive material itself and the further undesirable expense for use of the aircraft in that, for a given acreage covered, it must return for refilling more often. Such turnaround time can be exceedingly expensive, because often less than one-third of the total flying time is actually spent in dispensing the material. The foregoing article estimates that, for a ten-percent average reduction in turn-around time, there could be an annual savings at present rates of about seven-million dollars. That same article estimates that technological improvements in the uniformity of application could result in annual savings of as much as fifty-million dollars.

The Econ study serves to pinpoint details and provide apparently reasonable quantatitive estimates in an area in which quantitative parameters long have been recognized. One original effort at obtaining better spraying performance involved the use of a flagman placed at one end of a field to be sprayed. The flagman would carry a tall marker having a streamer or other feature easily seen by the pilot. At the end of each successive sweep of the field, the flagman would move to what he estimated to be the newly established edge of the just-deposited swath of material. Judging the width of the swath at the altitude he was flying and considering the nature of his spray apparatus, the pilot would then make his next run accordingly displaced to one side of the last swath. In situations where it was more economical for the pilot to make a turn after each swath, so as to return directly upon another contiguous swath, this procedure sometimes involved the use of an individual flagman at each end of the field.

At the very least, the use of ground-situated flagmen is inconvenient, and it may be dangerous to the individuals concerned as well as expensive to the operator. Particularly in the case of the spraying of any chemical that is toxic to the human individual, a considerable amount of additional expense must be encountered for the provision of proper suits and even breathing apparatus to supply non-contaminated air to the flagman.

Another approach that has been utilized is a mechanical flag ejector. It ejects a weighted streamer on command by the pilot. It is both cost effective and reasonably safe. However, it is deficient when used with regard to tall row crops. It also suffers from the fact that the pilot must visually estimate from the air where his last path margin is located and insure firing of the new missle at a point that will be most usable for him on the yet next successive path. And, unless he has previously deposited a whole row of such devices along a path margin, he still has no continuing indication of his parallel alignment with the previous swath except at one point.

Other analogous approaches have also used precise navigational aids that may include low-frequency radio receivers or inertial navigation systems. One system involves the use of several microwave transmitting towers disposed about the area by ground crews. At least one company, Motorola, Inc., has entered the field of what it calls electronic flagging. It has produced what it calls a Mini-Ranger airborne position control. This involves use of a system mounted in the aircraft which measures distances to unattended reference stations, automatically computes the location of the aircraft and then provides a course signal to an indicator which allows the pilot to accurately steer the aircraft along a desired path. Involving a complete automatic control system that amounts to a fully automatic pilot which includes ground reference, the Mini-Ranger system is very complex and expensive. Included in the electronic sophistication is even the capability of resuming a single traverse of a path intermediate its length, such as after returning for refueling and re-supply of the dispensed material. Thus, it is especially adaptable to the spraying of huge acreages of timber. But its cost represents a high degree of overkill if it were to be used for the simple spraying of a field of cotton, for example. Still further, it still suffers from the need for a ground crew to initially position and set up the ground reference stations.

In view of the foregoing, it is a general object of the present invention to provide new and improved path alignment apparatus that enables application of a material in a manner comparable to that obtained from more sophisticated apparatus, while yet being capable of implementation and use in an at least more convenient manner.

Another object of the present invention is to provide a path alignment apparatus which avoids the need for the use of any crewmen connected with the application of material other than the operator of the dispensing vehicle itself.

A further object of the present invention is to provide a new and improved path alignment apparatus capable of being implemented with the use of state of the art components.

It is still another object of the present invention to provide a new and improved path alignment apparatus which enables the operator of the vehicle to concentrate on both safe and effective operation of the vehicle, while yet being continually aware of any need for correction to achieve desired accuracy of dispensing.

In accordance with the present invention, a vehicle is capable of repeated traverses over an assigned area successively in respective different ones of a plurality of parallel paths displaced laterally one from another. Carried on the vehicle is path alignment apparatus that is related to delivery means which dispenses a material along each of the paths in a swath of predetermined width. The material includes an agent that presents characteristic radiation at a predetermined frequency. Sensing means is oriented to view the path of approach of the vehicle in order to detect the radiation and develop a discriminated signal which distinguishes between presence and absence of the radiation. Associated therewith is range-finding means for developing a distance signal that distinguishes the movement of the vehicle relative to the location of the path being approached. Finally, an indication means is responsive to the discriminated signal and the distance signal for developing an information signal that represents the degree of departure as between longitudinal edge margins of a previously dispensed swath and a new swath being approached by the vehicle.

The features of the present invention which are believed to be patentable are set forth with particularly in the appended claims. The organization and manner of operation of the invention, together with further objects and advantages thereof, may best be understood by reference to the following description taken in connection with the accompanying drawings, in the several figures which like reference numerals identify like elements, and in which:

FIG. 1 is an isometric view illustrating operation of an aircraft in which the present invention has been implemented;

FIG. 2 is a diagrammatic view illustrating performance of the present system;

FIG. 2a is a diagrammatic view of a display depicting an indication as viewed by the operator of the aircraft as shown in FIG. 1;

FIG. 3 is a location diagram of various components as they may be included in the aircraft mentioned with respect to FIG. 1;

FIG. 5 is a diagram of apparatus additionally included in connection with the aircraft of FIG. 1 as well as in depiction of an implementation of a portion of that which is shown in FIG. 4.

As indicated above, the specific embodiment to be described is presented in the environment of the application of materials by an aircraft to a field on which a crop is to grow or is growing. Accordingly, the following description will proceed specifically with respect to that environment. However, it is to be understood that underlying concepts of the invention are equally applicable in other fields of use and by means of delivery from other kinds of vehicles. One example of another field of use would be the dispensing of a material that would react on the area in order to provide an indication of a type of contamination. The type of moving vehicle involved could be any type of airborne vehicle, including fixed-wing, rotary wing, lighter-than-air or other such equipment. Moreover, the vehicle even could be non-airborne such as a crawler or a tractor-type apparatus including a long walking beam connecting its wheels or tracks. In the latter case, as will be seen, it probably would not be necessary to include some of the refinements hereinafter to be described particularly with regard to the aeronautical approach.

Thus, FIG. 1 illustrates an area or field 10 over which an aircraft 12 is to make repeated traverses successively in respect to different ones of a plurality of parallel paths displaced laterally one from another. Aircraft 12 in itself carries a conventional delivery system for dispensing a material along each of the paths in a swath of a predetermined width W. Such airplanes are often referred to as a "crop duster". The material may be composed of solid matter, such as a powder, that is to be applied to leaves of a growing plant or seeds that are to be sown, or it may be in the form of a spray of a liquid. In the example of FIG. 1, the aircraft has already completed two passes so that it has dispensed material along a first swath 14 and then along a second swath 15. After completing swath 15, the aircraft has turned about and is oriented to make a third swath by flying along a centerline 16, so spaced from the adjacent edge margin 18 of immediately-preceeding swath 15 as to laterally align the adjacent margin of the new swath with margin 18 of the previous swath.

As mentioned in the introduction, the material to be dispensed may be any of a variety of substances, including seeds, insecticides, pesticides, herbicides and defoliants. In any case, the material presents, or is mixed with an agent that presents, characteristic radiation at a predetermined frequency. In principle, the frequency of the characteristic radiation may be anywhere within the spectrum, provided that it can be detected as to source position by instrumentation carried on aircraft 12. For the embodiment specifically described herein, it is contemplated that the radiation be within the optical frequency range, from infrared through visible to ultraviolet. Moreover, the presentation of the radiation may be effected by fluorescence, phosphorescence, absorption or reflection. If phosphorescent, the agent is self-radiating. If fluorescent, the radiation may be activated either by normal daylight created by the sun, by natural infrared ground radiation modified by the agent or by illumination projected from aircraft 12.

Since accurate dispensing of the material requires flying close to the ground, it is seldom, if ever, that spraying is attempted at night. Accordingly, it is preferred in connection with the present embodiment to employ a material or agent that is fluorescent to daylight. That choice eliminates the necessity of additional equipment on the aircraft or on the ground. A suitable daylight-fluorescent agent is rhodamine WT. However, and as an example of the possibility of usage in a different range of the spectrum, a dye in the form of a derivative of 4-aminonaphalimide exhibits fluorescence when illuminated with ultraviolet light. In any event, the agent selected or otherwise existing is to exhibit its fluorescent, phosphorescent or other activity in a manner so as to have what is termed a characteristic frequency of maximum radiation. Typically, there will be a rapidly decreasing magnitude of radiation to either side of that characteristic frequency, so that a definitely discernable peak occurs at the characteristic frequency. The daylight-fluorescent material mentioned above exhibits a frequency of maximum radiation at 5780 Angstroms. On the other hand, the ultraviolet agent mentioned exhibits its peak at 3660 Angstroms.

Aircraft 12 carries instrumentation that includes sensing means for detecting the radiation presented by the agent and developing a discriminated signal that distinguishes between presence and absence of the radiation at a particular location ahead of the aircraft. As seen from the aircraft, the sensor's view of a portion of area 10 is represented by lines 20 and 22 that subtend an angle Y which is greater than one swath width W both during dispensing of the material and for a reasonable distance ahead of the beginning of a given swath, so as to allow the pilot of aircraft 12 sufficient time to make the necessary adjustments in his flight path before actually beginning to dispense materials in that swath.

Also carried by aircraft 12 is range-finding means for developing a distance signal that represents location of the aircraft relative to location of the desired path being approached. The range finder emits an electromagnetic signal along a narrow path 24 directly ahead of the aircraft. While it may be a conventional radar range finder operating at radio frequencies, as specifically embodied herein and as further to be described, the particular apparatus employed uses a laser. Because the edges of the field of view, as defined by lines 20 and 22 diverge, the lateral extent of the view relative to centerline 16 varies with distance of the aircraft from the ground area being surveyed. The range finder allows adjustment or compensation for that variation.

Additionally on board aircraft 12 is indication means that responds to the discriminated signal from the sensing means to develop an information signal which represents the degree of departure as between the longitudinal edge margin as at 18 of a previously dispensed swath and the new swath being approached by the aircraft. Such departure is illustrated in FIG. 2, wherein, as in FIG. 1, swaths 14 and 15 have already been completed. For the next swath, the approaching aircraft should be centered along path 16. As illustrated in FIG. 2, however, the actual centerline of the approach path of the aircraft is at 26, resulting in a departure from the desired centerline 16 of the distance E. At the same time, the previously-mentioned sensing means detects the edge margin 18 of the previous swath which appears at a particular position within the viewing angle Y. This information, as to the location within the field of view of edge 18 and the actual location of centerline 16, is correlated with the desired swath width in computational circuitry within the indication means already mentioned, so as preferably to provide a visual cockpit signal which conveys to the pilot the information as to the amount and direction of errors as between the desired centerline 16 and the actual centerline 26.

As can be observed in FIGS. 1 and 2, the viewed area is an ellipse. However, the horizontal width from a to b of that area does not, as such, change with altitude of the airplane. It does, of course, change with difference in range along any axis to the viewed area. Thus, the location of edge 18 as detected corresponds to distance from the centerline of the aircraft path. Substraction of actual distance yields the indication signal needed for representation to the pilot or controller. As indicated, the observed horizontal distance must be corrected with range to provide the desired information. This is rudimentary, because the basic pattern is only an equilateral triangle having a base (the width observed) and a height (the range). All long sides (20 and 22) and all angles are thereby fixed by geometric rules. Of course, the range calculation may readily be offset in the calculations when the range measurement is made either fore or aft of the point of width determination.

As preferred in the present embodiment for purposes of convenience and standardization, the information on error in path of approach is presented to the pilot on a display that depicts the information in what is conventional and well known as the fly-to-the-arrow mode. Such a display 28 features a visible abscissa defined by a series of marks 30 that correspond to angular departure. The actual centerline of the aircraft is represented centrally on the abscissa by a symbol at 32. The relative position of the desired aircraft centerline with respect to symbol 32 is represented by an indicator 34.

Such a representation is very familiar to pilots trained to use instrument landing systems. Symbol 32 represents his aircraft, while indicator 34 represents the "arrow" where his aircraft should be. The pilot needs only to maneuver his aircraft (represented by symbol 32) in the direction toward indicator 34. As he makes that maneuver, indicator 34 moves to the left in the illustration of FIG. 2a. When the latter merges with symbol 32, the aircraft is on course. With reference to FIG. 2, that same maneuver results in actual approach centerline 26 being moved to the right and into correspondence with desired centerline 16.

FIG. 3 illustrates in only a general manner an arrangement of aircraft 12 as modified to include the apparatus herein under discussion. Thus, aircraft 12 includes a fuselage 40 terminating at the front in a nose 42 and at the rear in a tail 44. Beneath tail 44 are aerelons 46. Wings 48, braced by struts 50, extend from either side of the mid-portion of fuselage 40. Located within fuselage 40 at an appropriate location is a hopper 52 that contains a mixture of the material and agent to be dispensed. For sprayer operation, there typically are a series of nozzles 54 distributed along the underside of the wing. A pilot 58 is seated within a compartment or cockpit 60 in a position to have a forwardly-directed line of vision 62 through a windshield 64.

In this case seated atop cockpit 60 and externally of the aircraft itself is a housing 66 that contains both the sensing means and range-finding means as mentioned above, with housing 66 being so structured and oriented as to permit those elements to have a "view" in front of the airplane. Subject to the availability of an adequate view forward of the aircraft, so as to be able to "see" the approaching path and the edge of the previous swath, housing 66 may optionally be located elsewhere on the exterior of the aircraft, and the sensing means and the direction finding means may be separately located in respectively different housings.

As preferably included in the present embodiment, display 28 is of the "see-through" type already known in the aircraft field for use in the display of other kinds of information and mounted on or adjacent to windshield 64 in the path of vision 62 of pilot 58. As will be described further below, display 28 permits the pilot to have an almost unobstructed view forwardly of the aircraft and yet presents the information directly in that same field of view. In the particular installation illustrated in FIG. 3, further components include a housing 68 located above pilot 58 in a position to activate display 28. Additional signal processing and computing apparatus are contained within a housing 70 that may be located elsewhere within any convenient part of the interior of fuselage 40.

Figures 4, 6:
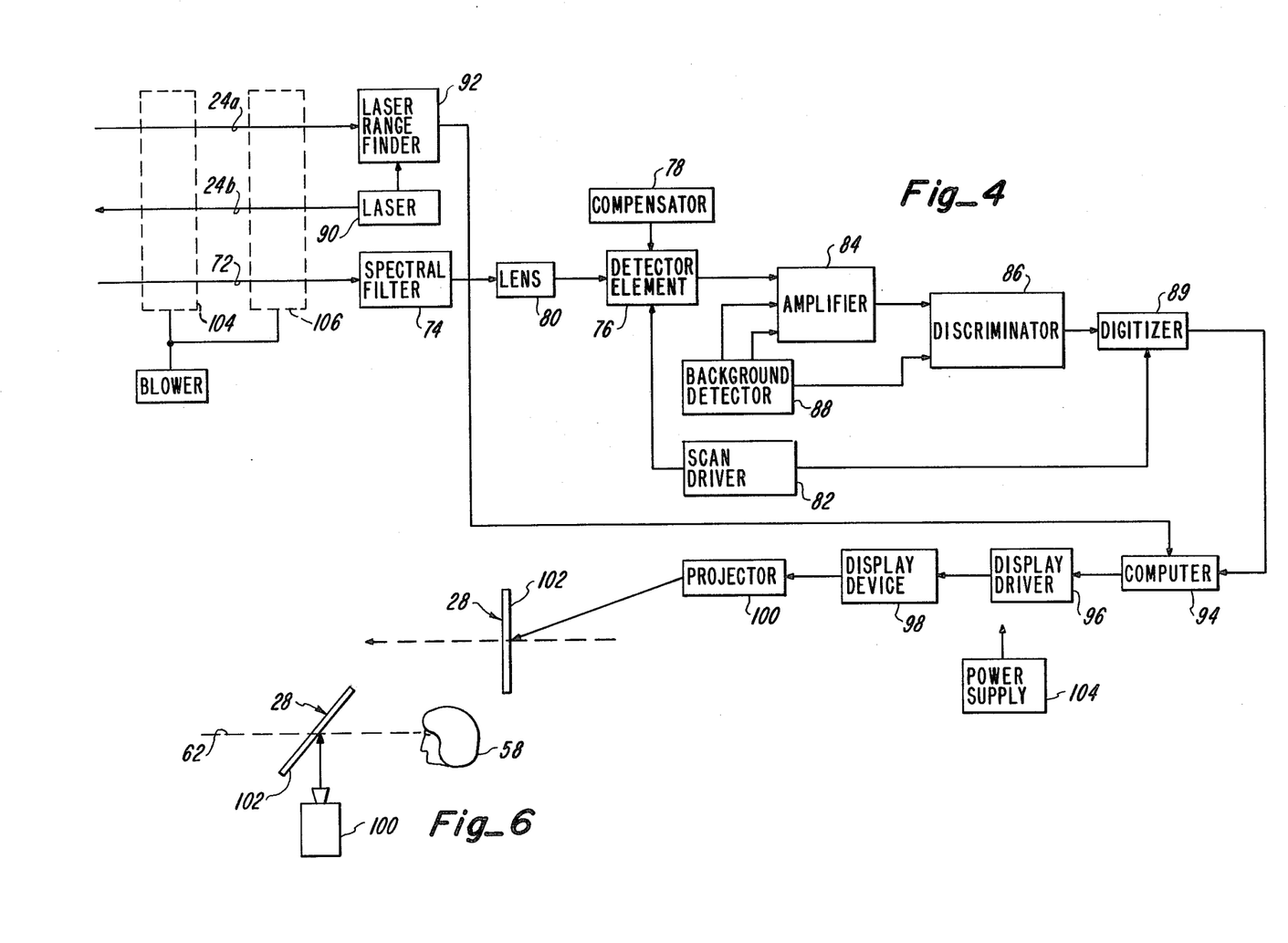
FIG. 4 is a block diagram of a path alignment apparatus included within the aircraft shown in FIG. 1.
FIG. 6 schematically represents an alternative to a portion of the arrangement shown in FIG. 3.

The overall path alignment system is shown in detail in FIG. 4. The characteristic radiation from the agent, mixed with the material dispensed, is received along a path 72 which is within the field of view as delineated by paths 20 and 22 in FIGS. 1 and 2. Disposed in path 72 is a spectral filter 74 that is transparent to the characteristic radiation from the material or agent and yet is significantly opaque to radiation of the same type at frequencies other than the predetermined frequency. That is, filter 74 is selectively transmissive at optical frequencies so as to pass the desired characteristic frequency while attenuating all others, or at least attenuating such others as might elicit a response by a following detector element 76. Such filters are well known. One commonly employed type utilizes a dielectric coating transparent to radiation substantially only at the desired frequency.

In the specific embodiment herein presented, detector element 76 is in the form of a sensitive intensified-target tube of the raster-scan type, stablized in operation by a compensator 78 responsive to ambient air temperature. Detector element 76 may take the form of any of a number of a well known image dissectors, vidicons, linear diode arrays or other devices that often serve as video camera elements. Typically included would be a photoelectric screen scanned in a raster by an electron beam to obtain an output signal. That screen is located in an image plane upon which the characteristic radiation transmitted through filter 74 is focused by a lens 80 disposed between filter 74 and detector element 76. A scan driver 82 drives beam deflection elements within detector element 76, so as to cause the raster scan. Elemental areas on the screen within detector element 76 that are exposed to the characteristic radiation effect a change in electron beam current, and that change as detected by the scanning operation constitutes an analog representation of the image as seen through lens 80 and transmitted through filter 74. The analog output signal from detector element 76 drives an amplifier 84 that, in turn, provides an amplified replica of the analog signal to one input of a discriminator 86.

Also included in the overall detection system is a background detector or compensator 88. Compensator 88 detects the background light level at the filtered frequency and supplies a first signal representative thereof to amplifier 84 as a gain control to prevent saturating overdrive when the total incoming light along path 72 is excessively bright. More importantly, compensator 88 provides a second input signal to discriminator 86 so as to establish a comparison or reference level.

Thus, the overall sensing means, that develops a discriminated signal, includes all of filter 74, lens 80, detector element 76, compensators 78 and 88, amplifier 84, scan driver 82 and discriminator 86. The result is to provide, at the output from discriminator 86, the ultimate discriminated signal which distinguishes between presence and absence of the characteristic radiation from the dispensed agent and as received in the image plane within detector element 76 instantaneously during the raster scanning operation. Accordingly, the ultimate discriminated signal serves to detect edge 18 of the last swath 15.

The output signal from discriminator 86 next is fed to a scanning-type digitizer 89 that serves to convert the analog representation into a digital representation. Conveniently for synchronization as between the operation of digitizer 89 and the raster scanning within detector element 76, scan driver 82 also drives the scanning mechanism within digitizer 89. In itself, digitizer 89 is a conventionally known analog-to-digital converter. As herein employed in cooperation with the raster-scanning type of detector element 76, digitizer 89 provides a digital word which is composed of the x-y coordinate determined by the signal from driver 82 and at a level as determined by the signal received from discriminator 86.

As already indicated, the apparatus also includes a range finder. To this end, a laser 90 beams electromagnetic energy at an optical frequency along a path **24*b* in line with the path of flight of aircraft 12. Upon striking the ground or any other object directly ahead of the aircraft, a portion of the energy is reflected back upon a path 24*a* to a range finder 92 that includes a photoelectric or other element responsive to the reflected energy. At least from the standpoint of practical operation, paths 24*a* and 24*b* are the same and correspond with path 24 as depicted in FIGS. 1 and 2. Upon receipt of the reflected energy propagated along path 24*a*, finder 92 develops an output signal which is fed to a computer 94**.

Computer 94 also receives the digitized signal developed at the output of digitizer 89. Computer 94 need not be particularly sophisticated, since it only has to tell the pilot where he is and where he wants to be. Of course, it could be combined with an automatic pilot system that would end up actually flying the aircraft automatically to obtain the desired ultimate result. In that case, the plane even could be a "drone", a vehicle operated without a human pilot and controlled remotely for take off and landing, and also as provided with additional signal processing, so as to determine the beginning and end of a dispensed swath length. However, it does not appear that such an approach would be practical in at least most cases, because the nature of the operation typically involves a need for most careful and often quick maneuvering of the aircraft to avoid nearby obstacles such as power lines, towers and ridges.

Using present-day technology, computer 94, therefore, preferably takes the form of a conventional microprocessor which is readily programmed by use of ordinary techniques to accomplish the necessary computational functions. Thus, computer 94 is programmed to combine the actual range as determined by finder 92 with the field of view information from digitizer 89 and as against a stored look-up table in order to supply what is a corrected field-of-view. Thus, the range signal is employed so as effectively to modify the digitized signal in order to compensate for variation in distance of the aircraft from the area being approached. The digitized swath edge 18 is determined by averaging the x-y positions of the total top-to-bottom scanned output signal originating from detector element 76. Combining the corrected field-of-view signal with a signal representing that average x-y position serves to determine the actual aircraft center-line position in relation to swath edge margin 18. The latter is the departure distance E as represented in FIG. 2. The previously inputted known swath width of the aircraft and the foregoing information with regard to departure distance are then combined to provide the ultimate informational error signal that is used to create the ultimate image upon display 28.

Further to the specific embodiment, the ultimate orientation signal derived from computer 94 is fed through a display driver 96 to a visual display device 98. Device 98 may be of any conventional form that produces a visual output image of the desired ultimate indication along a marked abscissa as described in connection with FIG. 2a and with reference to display 28. Thus, it may be a scanning type device, such as a single-line cathode ray tube. With the present state of art, it more desirably is a linear array of light emitting diodes arranged to establish the abscissa and markers 30 and 32 (FIG. 2a) on a continuously illuminated basis as well as to permit enhanced light output at the point on the abscissa corresponding to indicator 34.

In any case, the developed visual representation in the pattern which is to appear on display 28 is picked up and translated by an optical projector 100 arranged so that the visual image developed by display device 98 is imaged upon a screen 102 which is the active part of display 28. As indicated above, screen 102 is of the see-through type. To this end, the visual image produced by display device 98 is developed at a particular wavelength or color of visible light. At the same time, display screen 102 is what is known as a beam splitter coated such that it is reflective only of a very narrow wavelength which is the same as that of the light emitted from device 98. Projector 100 translates the image from device 98 onto screen 102 by use of an optical system that focuses the translated image at infinity. Because screen 102 is transparent at all wavelengths except that of the translated image, the image is reflected by screen 102 in a manner as to be highly visible to pilot 58. At the same time, however, the pilot has an essentially clear view of the terrain ahead of his aircraft. This manner of display is such that the pilot's eyes do not have to change their focus in order to visualize both the terrain and the reproduced image concurrently.

Also indicated in FIG. 4 is a power supply 104. It, of course, is connected as necessary to all of the different active components of the system in order to energize the same. In the alternative of FIG. 6, projector 100 is disposed beneath screen 102 instead of above as part of housing 68 in the manner shown in FIG. 3.

In flying through the air at the low altitudes involved, aircraft 12 frequently encounters objects such as dust and insects. At the same time, filter 74, laser 90 and range finder 92 necessarily employ forwardly-facing optical elements that are subject to being impinged upon and thus clouded by such objects. Accordingly, the apparatus preferably includes means disposed in advance of movement of the aircraft for deflecting air transversely of the oncoming sides of such elements. To this end, there desirably is further included, as schematically indicated in FIG. 4, a partical deflector 104 and a hood 106 disposed in the airstream ahead of the optical elements and further associated with a blower 108.

As shown in more detail in FIG. 5, but still in schematic form, hood 106 is in the form of a tube centered in front of the optical elements under discussion. Blower 108 is mounted to one side of the entrance into hood 106 and is provided with a nozzle 110 so as to project a high velocity jet of air laterally in front of the entrance to hood 106 as indicated by an arrow. Blower 108 receives its input through a fine-meshed filter 112 in turn coupled to an air inlet 114. Disposed ahead of nozzle 110 and slightly below the bottom of hood 106, deflector 104 is slanted upwardly and toward the entrance to hood 106 in a position to deflect oncoming air, together with its undesired objects such as the insects, upwardly and generally over hood 106 as shown by another arrow. Additionally, a portion of the high pressure air, developed by blower 108, is ducted by a conduit 116 into the cavity within hood 106. That causes a positive air flow forwardly and out of hood 106 as indicated by the pressure wave symbols and the associated arrows 118. The combination of nozzle 104 and the jet of air from deflector 110 serves to at least substantially reduce the entrance of the undesired objects into hood 106. Although not shown in the drawing, deflector 104 and the assembly that includes blower 108 are, of course, suitably secured to the airframe which defines fuselage 40.

It is also desired to allow compensation for surface wind components transverse to the flight path. In using the system as thus far described, the pilot will visually observe evidence of the velocity of that cross-wind and compensate accordingly in maneuvering the aircraft. Through experience in connection with landings and takeoffs, as well as in actual dispensing operations, he becomes trained to judge the necessary amount of correction by observing such evidence as blowing dust, leaves, plant stalks, smoke and so forth. Instead, however, another detector may view a fixed reference such as a nearby road, row of trees or line of telephone poles. Analogously to conventional instrument landing systems, another error signal is developed and fed to computer 94 which then also is programmed to introduce the desired correction automatically or to develop a separate display of a windage indication.

In an alternative such approach, the amount of overlap or underlap which nevertheless occurs is determined by detection of the relative intensity of the radiation in the region of the swath margin. The resulting quantitative signal is then employed to permit the introduction of either a programmed or a manual offset to allow for the windage. That same technique may also be used to introduce an allowance for variations in terrain.

It will be observed that every component needed to implement the overall path alignment system is a state-of-the-art device. Moreover, such components presently exist in such comparatively-small physical sizes as to enable their convenient installation in the aircraft or other vehicle.

During dispensing of the material, the pilot is provided with what is known as a "head-up" display of the only and quite simple information he needs in order to maneuver his aircraft in a manner to easily attain the ultimate objective of dispensing the material with a minimum of either undesired overlap or undesired underlap. As specifically described, the repeated traverses of the area to be covered are made with each successive swath contiguous with the last. Should it be desired, to accommodate in a given situation the avoidance of having to make too tight a turn after each swath, the successive paths could be staggered. In that case, of course, computer 94 would be programmed to account for the additional distance from the nearest edge margin of the last completed swath.

It was mentioned above that other than inherently-available daylight could be utilized, and that the activating illumination could be projected from the aircraft itself. One alternative adapted to that end could include the scanning of the beam from laser 90, or the inclusion of a separate laser system that was scanned, to repetitively sweep the sensor viewing angle, between lines 20 and 22 in FIGS. 1 and 2, and thereby enable the development of reflected characteristic radiation for sensing purposes. Should a single laser or other system be used for both purposes, range information would most desirably be obtained at the center of such a scanning technique.

While a particular embodiment of the invention has been shown and described, and a variety of alternatives have been disclosed, it will be obvious to those skilled in the art that other changes and modifications may be made without departing from the invention in its broader aspects. Therefore, the aim in the appended claims is to cover all such changes and modifications as fall within the true spirit and scope of the invention.

We claim:

1. For use in a vehicle capable of repeated traverses over an assigned area successively in respective different ones of a plurality of parallel paths displaced laterally one from another and including delivery means carried by said vehicle for dispensing a material along each of said paths in a swath of predetermined width, path alignment apparatus comprising:

sensing means carried by said vehicle and oriented to view the path of approach of said vehicle for detecting characteristic radiation at a predetermined frequency, presented by said material deposited in a previous swath, and developing a discriminated signal which distinguishes between presence and absence of said radiation over the fixed horizontal angular extent of the field of view from said vehicle;

range-finding means carried by said vehicle for developing a distance signal, representative of slant range from said vehicle, that represents location of said vehicle relative to the location of said path being approached and viewed along said horizontal angular extent;

and indication means carried by said vehicle and responsive to and correlating, by comparison thereof, said discriminated signal and said distance signal for developing an information signal that represents the degree of departure as between longitudinal edge margins of a previously dispensed swath and a new swath being approached by said vehicle, thereby permitting said degree of departure in response to said information signal to be indicated for changing the path of said vehicle relative to a previous one of said swaths.

2. Path alignment apparatus as defined in claim 1 in which said sensing means includes:

a filter oriented to receive and transparent to said characteristic radiation while being significantly opaque to other radiation of the same type at frequencies other than said predetermined frequency;

and a detector responsive to said characteristic radiation for developing said discriminated signal.

3. Path alignment apparatus as defined in claim 2 in which said filter is associated with a lens that focuses an image of the pattern of said characteristic radiation received through said filter upon said detector, and in which said detector effects a raster scan of said image and develops said discriminated signal as an analog representation of said image.

4. Path alignment apparatus as defined in claim 3 which further includes means for converting said analog representation into a digital representation, and in which said indication means responds to said digital representation.

5. Path alignment apparatus as defined in claim 4 in which said converting means includes a scan-controlled signal convertor and which further includes means for commonly effecting scanning of said raster in said detector and scanning in said converter.

6. Path alignment apparatus as defined in claim 2 in which said characteristic radiation is at an optical frequency, said filter is selectively transmissive at optical frequencies, and said detector is responsive at optical frequencies.

7. Path alignment apparatus as defined in claim 6 which further includes:

means responsive to an ambient level of illumination to which said sensing means is exposed for developing a control signal;

and means for responding to said control signal for governing operation of said detector.

8. Path alignment apparatus as defined in claim 7 which includes a signal amplifier, and in which said responding means compensatorily adjusts gain of said amplifier.

9. Path alignment apparatus as defined in claim 7 in which said detector further includes a discriminator, and in which said responding means supplies a reference signal acted upon by said detector.

10. Path alignment apparatus as defined in claim 1 in which said range-finding means further includes means for propagating electromagnetic energy from said vehicle toward said path and responsive to a reflected portion of said energy for developing said distance signal.

11. Path alignment apparatus as defined in claim 10 in which said energy also effectuates the presentation of said characteristic radiation from said material.

12. Path alignment apparatus as defined in claim 10 which further includes means responsive to said distance signal for effectively modifying said discriminated signal to compensate for variation in distance of said vehicle from said area.

13. Path alignment apparatus as defined in claim 1 in which said indication means includes a visual display screen upon which is presented said information signal in the form of a representation of said departure.

14. Path alignment apparatus as defined in claim 12 in which said visual display screen is disposed in the line of vision of an operator of said vehicle seeking to align said vehicle with a selected path, but in which said display screen is substantially transparent to said vision.

15. Path alignment apparatus as defined in claim 13 in which said information signal is optically delivered to said display screen.

16. Path alignment apparatus as defined in claim 14 in which said display screen is primarily transmissive at optical frequencies but is selectively reflective at a frequency of optical delivery of said information signal.

17. Path alignment apparatus as defined in claim 1 which further includes means disposed in advance of movement of said sensing means for deflecting air transversely of the oncoming side of said sensing means, thereby also deflecting particles of matter contained in said air.

18. Path alignment apparatus as defined in claim 16 which still further includes means for deflecting air mass approached by said sensing means away from said sensing means.

19. Path alignment apparatus as defined in claim 17 which also includes means for directing a filtered airstream laterally across and ahead of said sensing means.

20. Path alignment apparatus as defined in claim 18 in which a tubular hood is secured in place between said sensing means and said airstream.

* * * * *